United States Patent [19]

Nogami et al.

[11] Patent Number: 5,384,356
[45] Date of Patent: Jan. 24, 1995

[54] LIQUID COATING COMPOSITION FORMING A LIQUID CRYSTAL DISPLAY ELEMENT INSULATING FILM

[75] Inventors: Tatsuya Nogami; Rie Sakai, both of Funabashi, Japan

[73] Assignee: Nissan Chemical Industries, Ltd., Tokyo, Japan

[21] Appl. No.: 2,908

[22] Filed: Jan. 11, 1993

[30] Foreign Application Priority Data

Jan. 14, 1992 [JP] Japan ................................. 4-4961

[51] Int. Cl.$^6$ ................................................. C08K 5/22
[52] U.S. Cl. ..................................... 524/726; 524/858; 524/766; 524/786
[58] Field of Search ............... 524/858, 726, 766, 786; 252/299.01

[56] References Cited

U.S. PATENT DOCUMENTS

| | | | |
|---|---|---|---|
| 4,368,235 | 1/1983 | Vaughn, Jr. | 524/858 |
| 4,476,281 | 10/1984 | Vaughn, Jr. | 524/858 |
| 4,499,224 | 2/1985 | Anthony et al. | 524/858 |
| 4,978,702 | 12/1990 | Yuyama et al. | 524/858 |

Primary Examiner—Melvyn J. Marquis
Assistant Examiner—Karen A. Dean
Attorney, Agent, or Firm—Oliff & Berridge

[57] ABSTRACT

A liquid coating composition for the formation of a liquid crystal display element insulating film, which comprises a) hydrolyzed product of tetraalkoxysilane of the general formula (1) below and trialkoxysilane of the general formula (2) below, b) an aluminum salt, and c) a deposition inhibitor, dissolved in an organic solvent.

$$Si(OR)_4 \quad (1)$$

wherein R represents a C1-5 alkyl group $$R^1Si(OR^2)_3 \quad (2)$$

wherein $R^1$ represents an alkyl, alkenyl or aryl group, and $R^2$ represents a C1-5 alkyl group. The liquid coating composition according to the present invention is useful as an insulating film for a liquid crystal display element, as it exerts no adverse influence on the display property thereof.

5 Claims, No Drawings

LIQUID COATING COMPOSITION FORMING A LIQUID CRYSTAL DISPLAY ELEMENT INSULATING FILM

FIELD OF THE INVENTION

The present invention relates to a protective insulating film for a transparent conductive film of a liquid crystal display element. More particularly, it relates to a liquid coating composition which is applied to a transparent conductive film of a liquid crystal display element and hardened by heat to form a coating with excellent insulation property and surface hardness, for a more reliable liquid crystal display element and improvement in the production yield thereof.

DESCRIPTION OF THE PRIOR ART

The increasing size of liquid crystal display elements has been accompanied by the formation of oxide films for the purpose of insulation and protection of transparent electrodes. Known methods for the formation of these oxide films are gas-phase methods such as the vaporization method, the spattering method, etc. and methods of application which employ liquid coating compositions for the formation of oxide films, the latter being most widely used in light of productivity and ease of formation of films on largesized substrates. The liquid coating compositions used are hydrolyzed products of tetraalkoxysilanes, and complexes of other metal alkoxides or metal chelates.

The formation of insulating films by application methods is preferably done through thermal hardening at a temperature of 300° C. or less, to avoid such problems as variations in resistance of the transparent conductive film, energy loss, glass deformation, etc. When a hydrolyzed product of a tetraalkoxysilane is used as the liquid coating composition, full decomposition of the organic groups is achieved at a temperature of 300° C. or less, but it is known that the hydroxyl group bonded to a silicon atom, a so-called "silanol" group, remains undecomposed. On the other hand, it is known that substances with a high rate of hydrolysis, a titanium alkoxide for instance, undergo destruction of their hydroxyl groups at relatively low temperatures, while undecomposed alkoxy groups and chelates occurring from chelation remain even at a temperature of 450° C. or more.

Applied films having residual hydroxyl groups or undecomposed organic groups as mentioned above exhibit a low insulation resistance, and thus when they are used as protective insulating films for transparent conductive films of liquid crystal display elements, problems arise including irregularities in the liquid crystal display element displaying and other defects of displaying.

When all or a portion of the tetraalkoxysilane used in the liquid coating composition is a monoalkyltrialkoxysilane, it is clear that very little silanol remains, given the rates of hydrolysis and condensation of monoalkyl-trialkoxysilane. However, if the film obtained from a hydrolyzed product of a monoalkyl-trialkoxysilane was hardened at a temperature of 300° C. or less, it has a high water repellency. Therefore, when used as a protective insulating film, the applicability of a liquid crystal orientating film, particularly a polyimide liquid crystal orientating film, is greatly impaired, nullifying its usefulness as a coating composition.

SUMMARY OF THE INVENTION

The present invention relates to a liquid coating composition for the formation of insulating films which possess excellent insulation ability and surface hardness, and which, when applied and hardened, are useful as insulating films for liquid crystal display elements, also with excellent coating property of polyimide liquid crystal orientation films. It further relates to a liquid coating composition comprising a hydrolyzed product of a tetraalkoxysilane and a trialkoxysilane, an aluminum salt and a deposition inhibitor.

DETAILED DESCRIPTION OF THE INVENTION

A liquid coating composition for use in the formation of insulating films for liquid crystal display elements according to the present invention is characterized by comprising a hydrolyzed product of a tetraalkoxysilane of the general formula (1):

$$Si(OR)_4 \qquad (1)$$

Wherein R represents an alkyl-group of 1 to 5 carbon atoms; and a trialkoxysilane of the general formula (2):

$$R^1Si(OR^2)_3 \qquad (2)$$

Wherein $R^1$ represents an alkyl group, alkenyl group or aryl group, and $R^2$ represents an alkyl group of 1 to 5 carbon atoms; and aluminum salt and a deposition inhibitor, dissolved in an organic solvent.

The tetraalkoxysilane available for use in the present invention is represented by the general formula (1), wherein R represents an alkyl group of 1 to 5 carbon atoms, preferably a methyl group or ethyl group. Also, the trialkoxysilane is represented by the general formula (2), wherein $R^1$ represents a methyl group, ethyl group, propyl group, butyl group, pentyl group, hexyl group, heptyl group, octyl group, stearyl group, vinyl group, 3-chloropropyl group, 3-hydroxypropyl group, 3-glycidoxypropyl group, 3methacryloxypropyl group, phenyl group, etc. Also, $R^2$ represents an alkyl group of 1 to 5 carbon atoms, preferably a methyl group and ethyl group.

The above mentioned tetraalkoxysilane and trialkoxysilane are used in a range of combination where the molar ratio of tetraalkoxysilane is 0.1 to 2.0 times the number of moles of trialkoxysilane.

The aluminum salt to be used in the present invention is used to improve hardness when hardening of the film is done at a low temperature, and to improve spreadability of the polyimide orientation film onto the hardened film. Examples of such an aluminum salt include aluminum chloride, aluminum nitrate, aluminum sulfate, aluminum sulfamate, aluminum acetate, aluminum oxalate, or basic salts thereof.

The above mentioned aluminum salt is used at a molar ratio of around. 0.1 to 1.0 times the number of moles of the above mentioned tetraalkoxysilane and trialkoxysilane (collectively referred to herein as "alkoxysiliane").

The deposition inhibitor to be used in the present invention is used to prevent crystallization of said aluminum salt on the film surface during drying of the applied film. The deposition inhibitor may be one or more of the following: ethyleneglycol, N-methylpyrolidone, dimethylformamide, dimethylacetamide and derivatives thereof, and is used in an amount of at least equal weight ratio to the aluminum salt in terms of $Al_2O_3$.

The hydrolyzed product of a tetraalkoxysilane and a trialkoxysilane contained in a liquid coating composition according to the present invention is obtainable by hydrolysis of the said alkoxysilanes in an organic solvent in the presence of an acid catalyst or said aluminum salt. The hydrolysis of the alkoxysilanes is effected using water at a mole ratio of 0.5 to 2.5 times the number of moles of all the alkoxide groups of the alkoxysilane. If said aluminum salt is a hydrated salt, that amount of water is included in the measurement of the amount of water used in hydrolysis.

As described above, the mixing of the aluminum salt and the hydrolyzed product of an alkoxysilane may be done either at the time of hydrolysis of the alkoxysilane or after the completion thereof.

Examples of organic solvents which may be used for the hydrolysis include one or a mixture of two or more of any of the following: an alcohol such as methanol, ethanol, propanol, butanol, etc.; a ketone such as acetone, methylethyl ketone, etc.; an aromatic hydrocarbon such as benzene, toluene, xylene, etc.; a glycol such as ethylene glycol, propylene glycol, hexylene glycol, etc.; a glycol ether such as ethylcellosolve, butylcellosolve, ethylcarbitol, butylcarbitol, diethylcellosolve, diethylcarbitol, etc.; N-methylpyrrolidone, dimethylformamide, etc. When considering a method of application for transfer printing, spin coating and the like, a glycol or glycol ether with a boiling point of 120° C. or more is preferable. Addition of water for the hydrolysis is normally done at room temperature, but it may also be done while heating, as required. The liquid coating composition according to the present invention is obtained upon completion of this hydrolysis, but there is no problem with heating to a temperature of between 50° C. and 150° C. for aging. Further, low-boiling point alcohols appearing as byproducts may be removed after hydrolysis in order to raise the boiling point and increase the viscosity of the liquid coating composition.

A liquid coating composition according to the present invention preferably contains $SiO_2 + Al_2O_3$ at about 1 to 15 wt. % as solid content when the alkoxysilane is calculated in terms of $SiO_2$, and the aluminum salt in terms of $Al_2O_3$.

A liquid coating composition for the formation of a liquid crystal display element insulating film according to the present invention may be used in methods of application which are normally used for dipping, spin coating, transfer printing, brush coating, roll coating, spraying, etc. Also, by applying heat at a temperature of 100° C. or more after drying of the applied film, it is possible to obtain a hardened film on which a polyimide orientation film may be coated with excellent performance and which possesses excellent insulation property while having no adverse effect on the display property of the liquid crystal display element.

The tetraalkoxysilane and trialkoxysilane used in the present invention are present in such a manner that the molar ratio of the tetraalkoxysilane: the trialkoxysilane is in the range of 0.1 to 2.0:1. These are capable of forming an applied film with favorable insulation property which, when used as an insulating film for a liquid crystal display element, exerts no adverse influence on the display property thereof. If the above mentioned molar ratio is less than 0.1 the hardened film obtained by applying and heating the liquid coating composition exhibits a low mechanical strength, while if it is greater than 2.0 the effect of the trialkoxysilane used is lessened, adversely affecting the display property of the liquid crystal display element.

If the molar ratio of the aluminum salt to the alkoxysilane is less than 0.1, then hardened films formed by hardening the applied film at a temperature of 300° C. or less exhibit a low degree of mechanical strength and inferior spreadability of polyimide orientation films. If, on the other hand, the molar ratio is greater than 1.0, then not only does the hardened film exhibit no improvement in mechanical strength or coating ability of a polyimide orientation film, but its chemical resistance is also reduced.

If the deposition inhibitor, when the aluminum salt is calculated in terms of $Al_2O_3$, has a weight ratio to the $Al_2O_3$ of less than 1, the result is a reduced antideposition effect against crystallization of the aluminum salt during drying of the applied film, due to which crystallization of the aluminum salt occurs, blushing the applied film and making it impossible to obtain a uniform hardened film.

If the water used for the hydrolysis has a molar ratio of less than 0.5 with respect to the number of moles of all the alkoxy groups of the alkoxysilane, then hydrolysis is inadequate and results in a large residue of the alkoxysilane monomers, leading to poor filming ability of the liquid coating composition and no improvement in the mechanical strength of the hardened film obtained thereby. Conversely, if said molar ratio is more than 2.5, then the liquid coating composition lacks storage stability and its viscosity, tendency towards gelation, etc. is increased.

For a liquid coating composition according to the present invention, if the amount of $SiO_2 + Al_2O_3$ is less than 1 wt. % when calculation is made of the alkoxysilane and aluminum salt in terms of $SiO^2$ and $Al_2O_3$, respectively, then there is a reduction in the film thickness which may be obtained by a single application, and it is therefore necessary to make multiple applications to achieve the desired thickness, thus lowering the efficiency of the process. On the other hand, if the amount exceeds 15 wt. %, then the film thickness which may be obtained by a single application becomes too great, complicating efforts to obtain a uniform film, lowering the storage stability of the liquid coating composition and raising its viscosity and tendency towards gelation, etc.

Production of the liquid coating composition

Example 1

To a reaction flask equipped with a reflux condenser 8.0 g of tetraethoxysilane as the tetraalkoxysilane, 10.2 g of methyltriethoxysilane as the the trialkoxysilane, and 65.5 g of butylcellosolve as the solvent were charged, and the solution was stirred with a magnetic stirrer for mixing. A mixture was then added thereto which contained 1.9 g of aluminum nitrate-nonahydrate as the aluminum salt dissolved in 4.4 g of water and 10 g of ethylene glycol as the deposition inhibitor. After addition and mixture thereof, a solution temperature of 20° C. rose to 28° C. Stirring was continued under these conditions for 30 minutes to produce a liquid coating composition.

The viscosity, solid content, etc. of the liquid coating composition is listed in Table 1.

Examples 2 to 7

The method of production used was the same as that in Example 1, whereby liquid coating compositions were produced with their respective compositions. These compositions, etc. are listed in Table 1.

Comparative Example 1

To a reaction flask equipped with a reflux condenser 8.3 g of tetraethoxysilane as the tetraalkoxysilane, 10.7 g of methyltriethoxysilane as the trialkoxysilane, and 66.4 g of butylcellosolve as the solvent were charged, and the solution was stirred with a magnetic stirrer for mixing. A mixture containing 0.5 g of nitric acid dissolved in 4.6 g of water and 10 g of ethylene glycol was then added thereto as a catalyst. After addition and mixture thereof, a solution temperature of 20° C. rose to 28° C. Stirring was continued under these conditions for 30 minutes to produce a liquid coating composition. The viscosity, solid content, etc. of the liquid coating composition is listed in Table 1.

Comparative Example 2

The method of production used was the same as that in Example 1, but only tetraethoxysilane was used as the alkoxysilanes to produce the liquid coating composition. The composition thereof, etc. is listed in Table 1.

Comparative Example 3

The method of production used was the same as that in Comparative Example 1, but only tetraethoxysilane was used as the alkoxysilanes to produce the liquid coating composition. The composition thereof, etc. is listed in Table 1.

at 300° C. for 30 minutes to harden the film, and the film properties of each was measured.

In addition, a polyimide orientation film (Sunever-SE150, manufactured by Nissan Chemical Industries, Ltd.) was spin-coated onto the hardened film obtained above, and the applicability of the polyimide orientation film was tested. The results are listed in Table 2.

The tested properties of the film listed in Table 2 are explained below.

Hardness: The surface hardness was measured after hardening by heat of the film, using the pencil hardness test method JIS K5400.

Volume resistance: Measurement was done by metallization of aluminum as an electrode on the film surface.

Coating property of an orientation film: Visual observation was made to determine the coating property of a polyimide orientation film to the hardened film. Cases where the coating property was favorable are indicated by mark and those where it was unfavorable are indicated by mark X.

Liquid Crystal Cell Display Properties Test Example

The liquid coating compositions obtained in the above examples were each spin coated onto two sheets of glass (surface resistance 30 $\Omega/\square$, line width 250 $\mu$, line spacing 25 $\mu$) having ITO transparent electrodes, and a 0.1 $\mu$ insulation film was formed by heat treatment at 300° C. for 30 minutes. Polyimide resin SE-150 was further spin coated thereon, and a 0.1 $\mu$ polyimide orientation film was formed by heat treatment at 250° C. for 1 hour. This was then subjected to rubbing treatment, during which a spacer was inserted and a cell was composed by twisting the direction of rubbing by 240°.

Liquid crystals (ZLI-2293, by Merk Co.) were then

TABLE 1

Examples of Liquid Application Production

| | Tetraalkoxy-silane (g) | Trialkoxysilane (g) | Aluminum salt (g) | anti-deposition inhibitor (g) | $H_2O$ (g) | Solvent (g) | Viscosity (cps) | Solid content (wt. %) |
|---|---|---|---|---|---|---|---|---|
| Exam. 1 | Tetraethoxy-silane 8.0 | Methyltriethoxysilane 10.2 | $Al(NO_3)_3 \cdot 9H_2O$ 1.9 | Ethylene glycol 10 | 4.4 | Butylcellosolve 65.5 | 6 cps | 6 |
| Exam. 2 | Tetraethoxy-silane 6.9 | Methyltriethoxysilane 8.8 | $Al(NO_3)_3 \cdot 9H_2O$ 7.7 | Ethylene glycol 10 | 3.8 | Butylcellosolve 62.8 | 7 cps | 6 |
| Exam. 3 | Tetraethoxy-silane 4.5 | Methyltriethoxysilane 5.8 | $Al(NO_3)_3 \cdot 9H_2O$ 20.3 | Ethylene glycol 10 | 2.5 | Butylcellosolve 56.9 | 10 cps | 6 |
| Exam. 4 | Tetraethoxy-silane 1.7 | Methyltriethoxysilane 13.2 | $Al(NO_3)_3 \cdot 9H_2O$ 7.7 | N-methyl-pyrrolidone 10 | 2.5 | Butylcellosolve 64.9 | 7 cps | 6 |
| Exam. 5 | Tetraethosy-silane 11.4 | Methyltriethoxysilane 4.9 | $Al(NO_3)_3 \cdot 9H_2O$ 7.7 | Ethylene glycol 10 | 4.1 | Butylcellosolve 61.9 | 7 cps | 6 |
| Exam. 6 | Tetra methoxysilane 5.1 | Methyltrimethoxysilane 6.7 | $Al(NO_3)_3 \cdot 9H_2O$ 7.7 | Dimethyl-formamide 10 | 4.1 | Butylcellosolve 66.7 | 6 cps | 6 |
| Exam. 7 | Tetraethoxy-silane 6.9 | Methyltriethoxysilane 8.8 | $Al_2(OH)_2(C_2O_4)_2 \cdot 9H_2O$ 4.4 | Ethylene glycol 10 | 3.8 | Butylcellosolve 66.1 | 5 cps | 6 |
| Com. Exam. 1 | Tetraethoxy-silane 8.3 | Methyltriethoxysilane 10.7 | | Ethylene glycol 10 | 4.6 | Butylcellosolve 66.4 | 3 cps | 6 |
| Com. Exam. 2 | Tetraethoxy-silane 17.2 | | $Al(NO_3)_3 \cdot 9H_2O$ 7.7 | Ethylene glycol 10 | 4.6 | Butylcellosolve 63.5 | 7 cps | 6 |
| Com. Exam. 3 | Tetraethoxy-silane 20.8 | | | | 5.4 | Butylcellosolve 73.3 | 3 cps | 6 |

Film Test Example

The liquid coating compositions obtained in the examples were each used to form films, using a spin coater rotating at 4000 rpm for 20 seconds, onto a 1.1 mm thick glass substrate on which an ITO film had been formed as a transparent electroconductive film by spattering on the entire surface. After drying the film on a hot plate at 60° C. for 3 minutes, heat was applied using a clean oven infused into the cell, and the display was observed with impression thereon of a triangular wave of 0.1 Hz, ±5 V.

An aging test was also conducted at 60° C. for 15 hours, with the impression on the cell of a rectangular wave of 100 Hz, ±5 V, after which the display was observed under said conditions. The results are listed in Table 2. In the table, mark X is used to indicate cases of display irregularity, and ○ is used to indicate a lack thereof.

TABLE 2

| | Film and Cell Display Experiments | | | | | |
|---|---|---|---|---|---|---|
| | Film thickness ($\mu$) | Hardness | Volume resistance rate $\times$ $10^{13}$ $\Omega \cdot$ cm | Coating property of an orientation film | Display irregularities | |
| | | | | | Immediately after cell formation | After aging test |
| Exam. 1 | 0.10 | 9H | 42 | ◯ | ◯ | ◯ |
| Exam. 2 | 0.11 | 9H | 20 | ◯ | ◯ | ◯ |
| Exam. 3 | 0.15 | 9H | 10 | ◯ | ◯ | ◯ |
| Exam. 4 | 0.13 | 9H | 50 | ◯ | ◯ | ◯ |
| Exam. 5 | 0.10 | 9H | 9 | ◯ | ◯ | ◯ |
| Exam. 6 | 0.11 | 9H | 20 | ◯ | ◯ | ◯ |
| Exam. 7 | 0.10 | 9H | 20 | ◯ | ◯ | ◯ |
| Com. Exam. 1 | 0.10 | 6H | 40 | X | ◯ | ◯ |
| Com. Exam. 2 | 0.11 | 9H | 0.3 | ◯ | ◯ | X |
| Com. Exam. 3 | 0.10 | 5H | 0.5 | ◯ | X | X |

A liquid coating composition according to the present invention is excellent for the application of a polyimide orientation film thereon and allows the formation of an insulating film with excellent mechanical strength, despite its containing highly water-repellant trialkoxysilane.

Further, the film is very useful as an insulating film for a liquid crystal display element, as it exhibits a high degree of insulation and has no adverse influence on the display property of the liquid crystal element when it is employed for such purpose.

We claim:

1. A liquid coating composition for the formation of a liquid crystal display element insulating film, which comprises a hydrolyzed product of a tetraalkoxysilane of the general formula (1):

$$Si(OR)_4 \quad (1)$$

Wherein R represents an alkyl group of 1 to 5 carbon atoms;

a trialkoxysilane of the general formula (2):

$$R^1Si(OR^2)_3 \quad (2)$$

Wherein $R^1$ represents an alkyl group, alkenyl group or aryl group, and $R^2$ represents an alkyl group of 1 to 5 carbon atoms;

an aluminum salt; and a deposition inhibitor, dissolved in an organic solvent.

2. A liquid coating composition for the formation of a liquid crystal display element insulating film according to claim 1, characterized by containing the tetraalkoxysilane at a molar ratio of 0.1 to 2.0 times the number of moles of the trialkoxysilane.

3. A liquid coating composition for the formation of a liquid crystal display element insulating film according to claim 1, characterized by containing the aluminum salt at a molar ratio of 0.1 to 1.0 times the mole number of moles of the tetraalkoxysilane and the trialkoxysilane.

4. A liquid coating composition for the formation of a liquid crystal display element insulating film according to claim 1, characterized by containing the deposition inhibitor at an equal or greater weight ratio to the aluminum salt in terms of $Al_2O_3$.

5. A liquid coating composition for the formation of a liquid crystal display element insulating film according to claim 1, characterized in that the deposition inhibitor is ethylene glycol, N-methylpyrrolidone, dimethylformamide, dimethylacetamide or a derivative thereof.

* * * * *